(12) United States Patent
Robertson

(10) Patent No.: US 10,180,243 B1
(45) Date of Patent: Jan. 15, 2019

(54) WALK-BEHIND LAWN MOWER UNIVERSAL LIGHTING ASSEMBLY

(71) Applicant: Gary Blain Robertson, Arlington, TX (US)

(72) Inventor: Gary Blain Robertson, Arlington, TX (US)

( * ) Notice: Subject to any disclaimer, the term of this patent is extended or adjusted under 35 U.S.C. 154(b) by 0 days.

(21) Appl. No.: 15/894,160

(22) Filed: Feb. 12, 2018

(51) Int. Cl.
| | |
|---|---|
| *F21V 21/088* | (2006.01) |
| *F21V 21/30* | (2006.01) |
| *A01D 34/00* | (2006.01) |
| *A01D 34/82* | (2006.01) |
| *F21S 9/02* | (2006.01) |
| *F21V 3/00* | (2015.01) |
| *F21V 15/01* | (2006.01) |
| *A01D 34/08* | (2006.01) |
| *F21V 7/28* | (2018.01) |
| *A01D 101/00* | (2006.01) |
| *A01D 34/68* | (2006.01) |
| *F21Y 115/10* | (2016.01) |

(52) U.S. Cl.
CPC ............ *F21V 21/30* (2013.01); *A01D 34/001* (2013.01); *A01D 34/824* (2013.01); *F21S 9/02* (2013.01); *F21V 3/00* (2013.01); *F21V 15/01* (2013.01); *F21V 21/088* (2013.01); *A01D 34/68* (2013.01); *A01D 2101/00* (2013.01); *F21V 7/28* (2018.02); *F21Y 2115/10* (2016.08)

(58) Field of Classification Search
CPC .... A01D 34/001; A01D 34/824; F21V 21/30; F21V 15/01; F21V 3/00; F21V 21/088; F21S 9/02
See application file for complete search history.

(56) References Cited

U.S. PATENT DOCUMENTS

| | | | | |
|---|---|---|---|---|
| 5,146,735 | A | * | 9/1992 | McDonner ......... A01D 34/6806 180/19.3 |
| 5,563,774 | A | | 10/1996 | Welsch |
| 5,607,225 | A | * | 3/1997 | Halvatzis ................ A47F 3/001 362/125 |
| 7,040,791 | B2 | | 5/2006 | Nakamura et al. |
| 7,441,922 | B2 | * | 10/2008 | Huang ..................... F21K 9/65 362/225 |
| 7,779,568 | B2 | | 8/2010 | Gettelfinger et al. |
| 8,646,952 | B2 | | 2/2014 | Walden et al. |

(Continued)

*Primary Examiner* — Anh Mai
*Assistant Examiner* — Nathaniel Lee
(74) *Attorney, Agent, or Firm* — Mark C. Johnson; Johnson | Dalal

(57) ABSTRACT

A universal lighting assembly detachably couples to a handle of a walk-behind lawn mower to illuminate areas in front of lawn mower. The assembly is universal, and thus operable with wide varieties of walk-behind lawn mowers. The lighting assembly comprises a light housing having a left side, a right side, and a front face with at least one LED. A left-side and a right-side arm project outwardly from the light housing. A concave clamp from each arm couples to the mower handles. A cylindrical drum couples to the left-side and right-side arms. The clamps and drum are stationary and not designed to rotate when clamped to the handle; thereby permitting rotation of the housing. A spring is housed within the cylindrical drum and with opposing ends coupled to left and right-side arms. The spring biases each arm in a longitudinal direction of cylindrical drum against lawn mower handles.

20 Claims, 13 Drawing Sheets

(56) References Cited

U.S. PATENT DOCUMENTS

| | | |
|---|---|---|
| 2003/0012033 A1 | 1/2003 | Shikiya |
| 2010/0091494 A1* | 4/2010 | Pearson .............. E04F 11/1834 362/249.02 |
| 2012/0113633 A1 | 5/2012 | Bowen |
| 2016/0116145 A1 | 4/2016 | Moyers |
| 2016/0305636 A1 | 10/2016 | Varhola |
| 2016/0335932 A1 | 11/2016 | Perez-Bravo et al. |

* cited by examiner

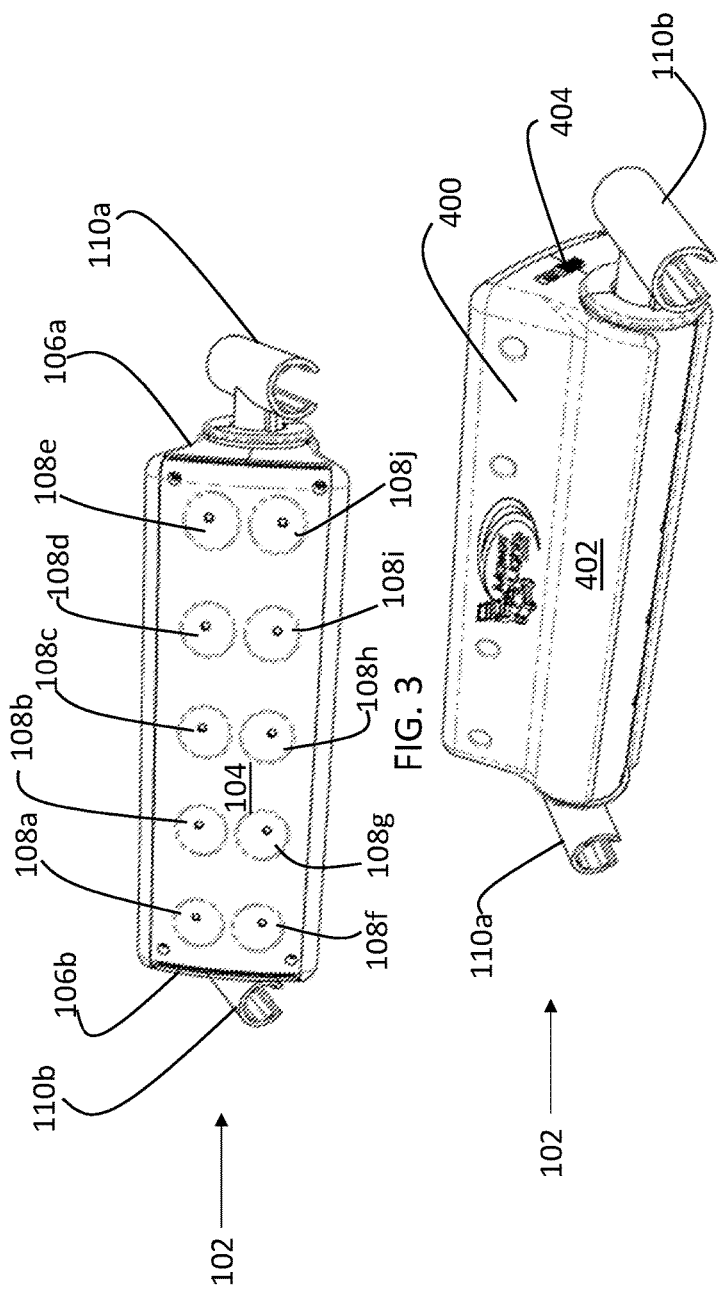

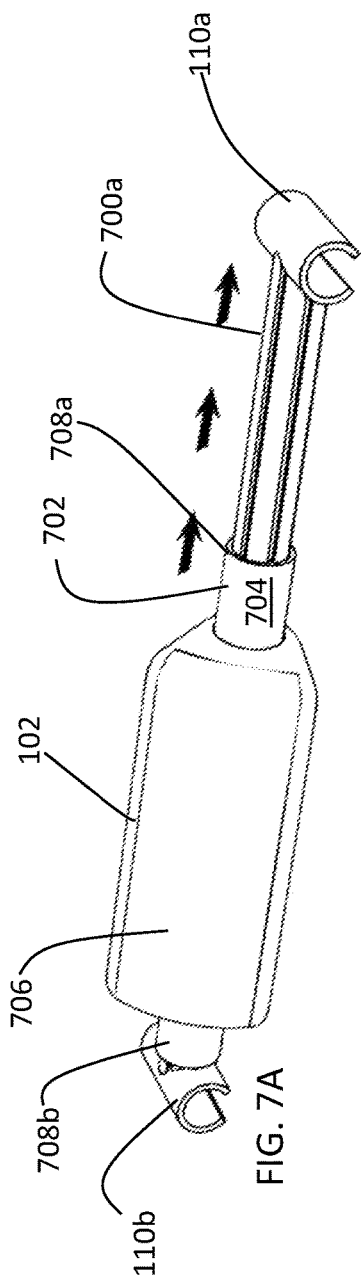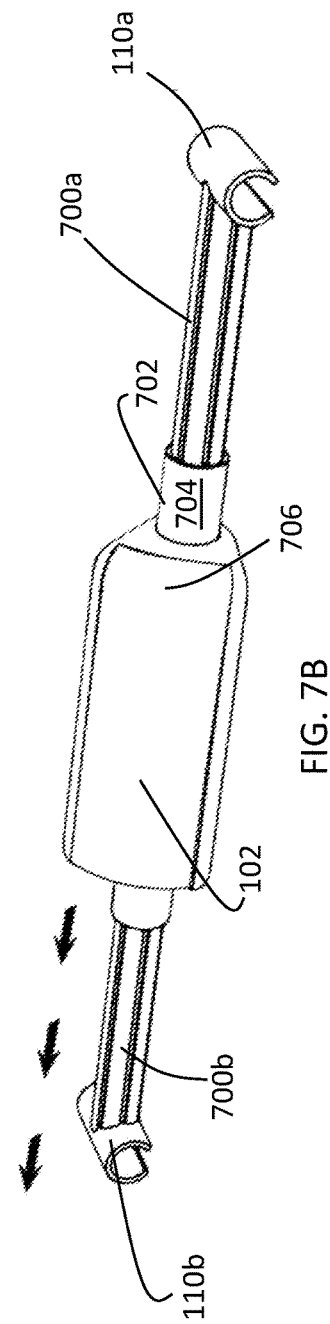
FIG. 7A
FIG. 7B

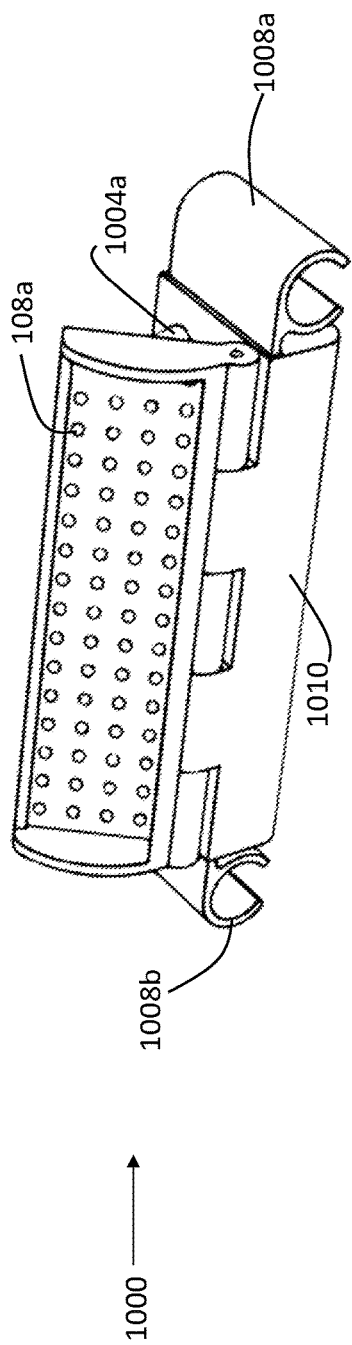
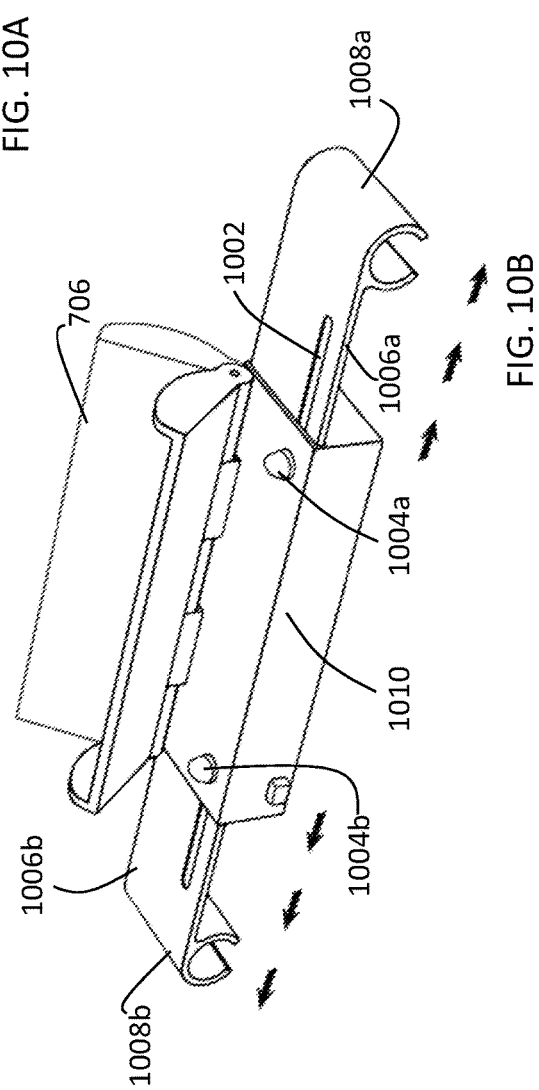

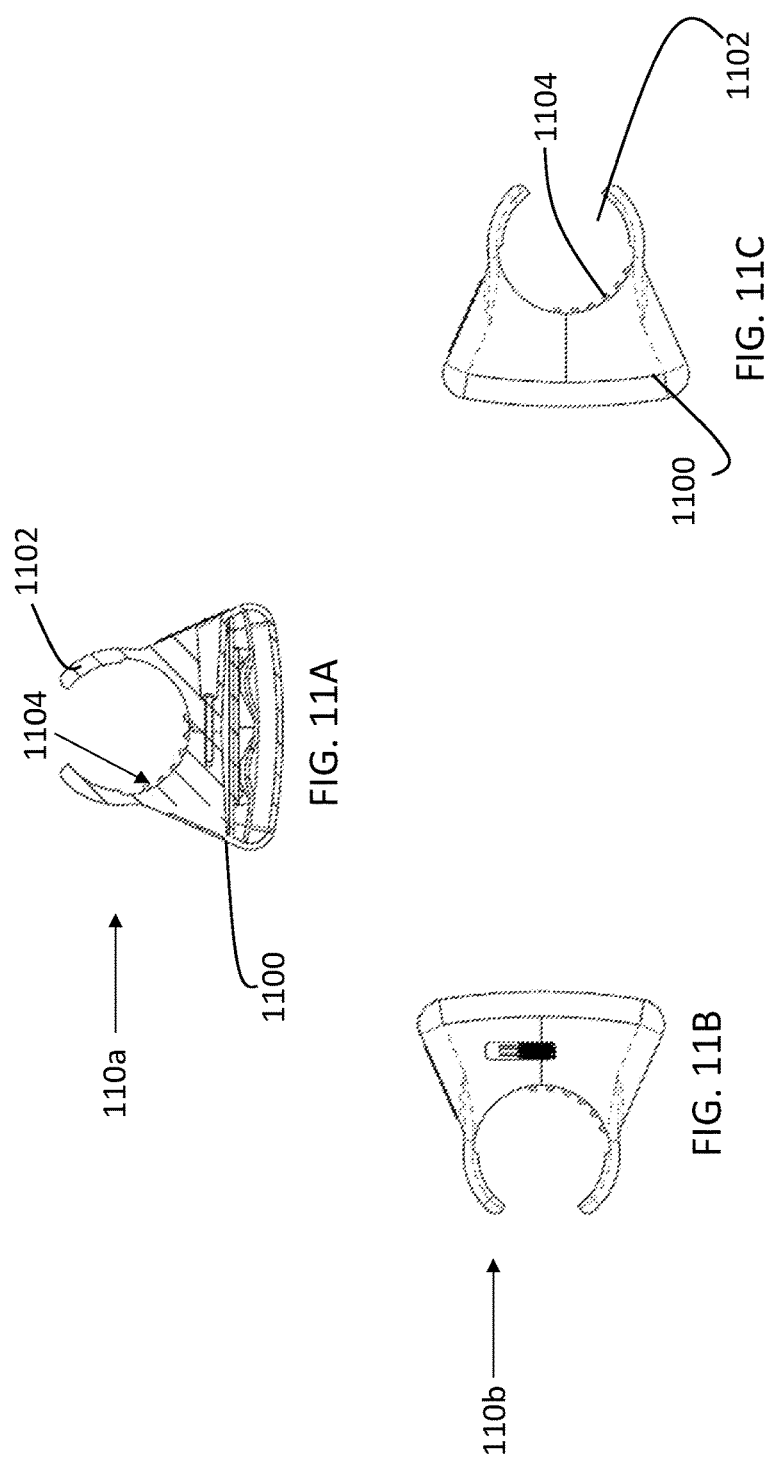

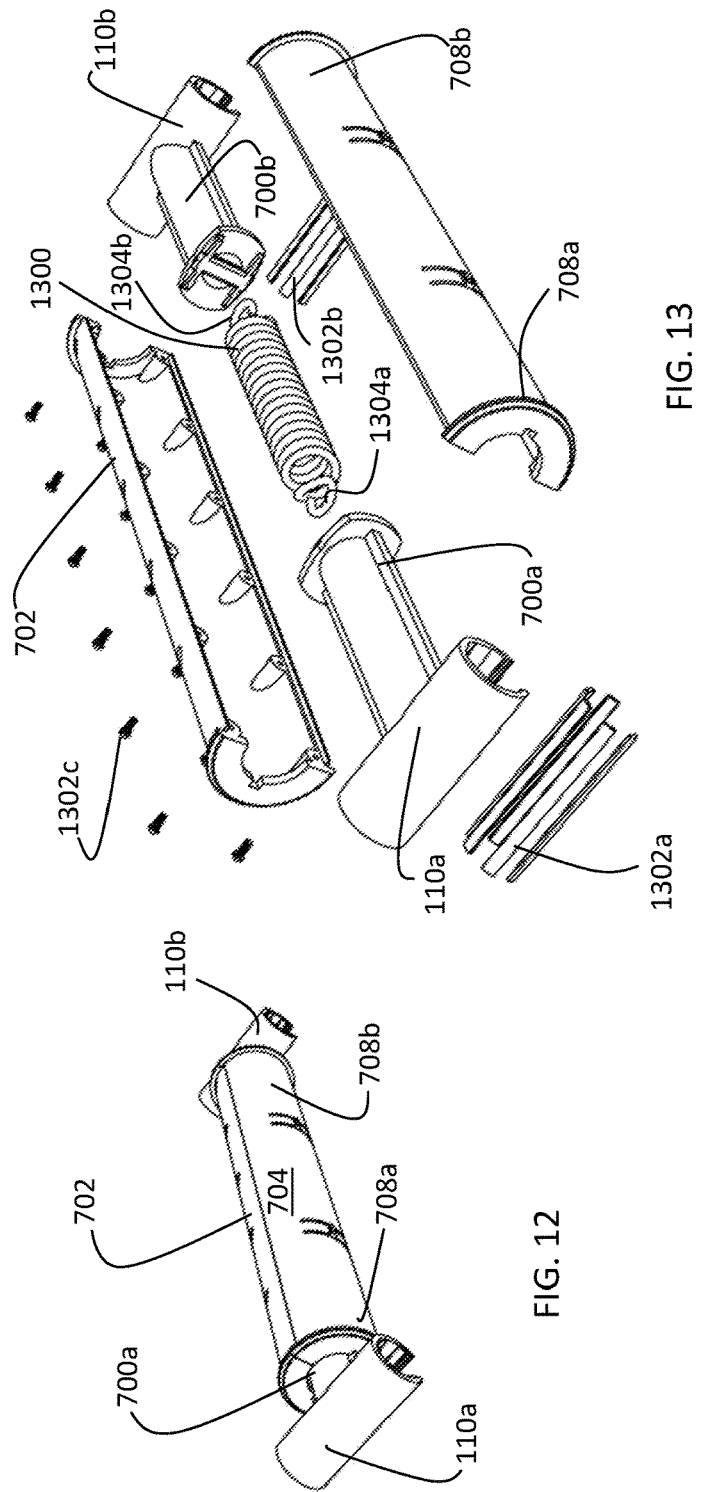

WALK-BEHIND LAWN MOWER UNIVERSAL LIGHTING ASSEMBLY

FIELD OF THE INVENTION

The present invention relates generally to a walk-behind lawn mower universal lighting assembly, and, more particularly, relates to a universal lighting assembly that detachably couples to eclectic sizes and shapes of handles for walk-behind lawn mowers to enable directional and intensity adjustable illumination of the ambient surroundings low-light environments.

BACKGROUND OF THE INVENTION

Typically, a lawn mower is a horticultural mechanism for mowing lawns planted in a home's yard, playground, or the like. The lawn mower utilizes one or more revolving blades to cut vegetation, such as a grass surface, to an even height. The most common power source for lawn mowers is a small, typically one-cylinder internal combustion engine. Smaller mowers often lack any form of propulsion, requiring human power to move over a surface; walk-behind mowers are often, but necessarily, self-propelled, requiring a human only to walk behind and guide them. The walk-behind mower type is typically designed for mowing the lawn while directly pushing the lawn mower from behind.

Often, such laborious work of pushing, pulling, and manipulating the walk-behind lawn mower requires great physical exertion. This is especially difficult when operating the walk-behind lawn mower in the heat of the day. However, mowing the lawn later in the day, when the temperature is cooler, has disadvantages because it can be difficult to see the vegetation to determine if the user has already mowed a specific part of the lawn, or if there are any obstructions on the lawn, such as toys, rocks, and other items.

Specifically, the leading cause of lawnmower accidents is contact with its rotating blade. While the danger from this cause may seem obvious, it is an established fact that people will place their fingers near the blade, generally in an attempt to clear away a clump of grass or other undesired matter. Most of these accidents occur when the person reaches under the "skirt" of the mower, or reaches into the discharge chute. Another cause of accidents is the throwing of objects, such as small stones, by the blade. The tip of the blade can be moving as fast as 200 miles per hour, and can project small, hard objects as far as 50 feet. These objects can travel in any direction, depending on the angle at which the blade encounters them, and can injure nearby persons, including the operator. These problems are exacerbated in low-light conditions.

Therefore, a need exists to overcome the problems with the prior art as discussed above.

SUMMARY OF THE INVENTION

The invention provides a walk-behind lawn mower universal lighting assembly that overcomes the hereinafore-mentioned disadvantages of the heretofore-known devices, and methods of this general type and that easily couples and decouples to the vertical handle members of an eclectic assortment of lawn mowers through use of spring-biased lateral arms. The lighting assembly incrementally rotates at least one LED towards the area in front of the walk-behind lawn mower to enable directional and intensity adjustable illumination of the ambient surroundings in low-light environments. Specifically, the invention will help to facilitate in creating a neatly mowed lawn, that may not have been possible in low-light conditions, without the aid of the present invention. Importantly, this invention will also aid in the personal safety of the lawn mower operator, when the need arises to mow the lawn in low-light conditions.

With the foregoing and other objects in view, there is provided, in accordance with the invention, and in combination with a walk-behind lawn mower, a universal lighting assembly that detachably couples to a U-shaped handle of the walk-behind lawn mower to illuminate the area in from of the walk-behind lawn mower, and the ambient surroundings of the walk-behind lawn mower in low-light environments.

The lighting assembly is universal, and thus operable to easily attach to variously sized and shaped handles for standard walk-behind lawn mowers. The walk-behind lawn mower to which the lighting assembly attaches may include a front area having a deck that at least partially covers at least one blade. The blade is operably coupled to a motor. Further, the walk-behind lawn mower comprises wheels that are rotatably coupled to the deck. Further, the walk-behind lawn mower comprises a U-shaped handle with respective distal ends of first and second vertical handle members that is coupled to the deck. The lighting assembly detachably couples to the U-shaped handle of the walk-behind lawn mower.

In one non-limiting embodiment, the lighting assembly comprises a light housing. The light housing is defined by a left side, a right side opposing the left side, and a front face with at least one LED, or other light source, disposed thereon. The LED is electrically coupled to a power source coupled to the light housing. The power source is operably configured to supply power to the LED.

The lighting assembly couples to the U-shaped handle of the walk-behind lawn mower through use of spring-biased lateral arms. The arms may include a left-side arm projecting outwardly from the left side of the light housing. The left-side arm terminates at a left concave clamp directly coupled and retained to the first vertical handle member. The lighting assembly further comprises a right-side arm projecting outwardly from the right side of the light housing. The right-side arm terminates at a right concave clamp directly coupled and retained to the second vertical handle member.

The front face of the light housing is coupled to the left-side arm and the right-side arm, so as to enable rotation of the light housing. In this manner, the front face, containing the LED, rotates with respect to the retained left-side and right-side arms. Though in other embodiments, the left-side arm and the right-side arm rotate with the housing.

In accordance with another feature, an embodiment of the present invention includes a cylindrical drum that is coupled to the left-side and right-side arms. The light housing includes a rear face opposing the front face. The rear face of the light housing forms a concave surface shaped and sized to receive a cylindrical surface of the cylindrical drum. In this embodiment, the clamps and drum are stationary and not designed to rotate when clamped to the handle; thereby permitting rotation of the housing.

In accordance with a further feature of the present invention, an embodiment of the present invention includes a spring that is housed within the cylindrical drum. The spring has opposing ends respectively coupled to the left-side and right-side arms. The spring biases the left-side and right-side arms in a longitudinal direction of the cylindrical drum.

In accordance with a further feature of the present invention, the spring compressively biases the left-side and right-side arms.

In accordance with yet another feature, an embodiment of the present invention includes the cylindrical drum comprising a guide member spanning along a longitudinal length of the left-side and right-side arms.

In accordance with a further feature of the present invention, the cylindrical drum further comprises a left end and a right end opposing the left end. The left and right ends of the cylindrical drum define slots spatially coupled to a cavity of the light housing. The guide member of the left-side and right-side arms is respectively disposed within, and substantially restricted from rotational movement by, the portion of the cylindrical drum defining the slots of the left end and right end of the cylindrical drum.

in accordance with another feature, an embodiment of the present invention also includes the cylindrical drum being coupled to the light housing, and housing a portion of the left-side and right-side arms. The left-side and right-side arms are directly coupled to opposing ends of the spring. The spring biasing the left-side and right-side arms in a longitudinal direction of the cylindrical drum.

In accordance with a further feature of the present invention, the assembly further includes a plurality of LEDs that are disposed on the front face of the light housing. The front face of the light housing spans greater than 75% of a width defined by the first and second vertical handle members in which the concave clamps of the respective left-side and right-side arms are coupled.

Although the invention is illustrated and described herein as embodied in a universal lawn mower lighting assembly, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are rewarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising open language), The term "coupled," as used herein is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the left-side and right-side arms.

BRIEF DESCRIPTION OF THE DRAWINGS

The accompanying figures, where like reference numerals refer to identical or functionally similar elements throughout the separate views and which together with the detailed description below are incorporated in and fora part of the specification, serve to further illustrate various embodiments and explain various principles and advantages all in accordance with the present invention.

FIG. 3 is a perspective view of a front face of an exemplary light housing with a plurality of LEDs, in accordance with one embodiment of the present invention;

FIG. 4 is a perspective view of a rear face of the light housing of FIG. 3;

FIGS. 7A and 7B are perspective views of a left-side arm and a right-side arm extending from the sides of the light housing, wherein FIG. 7A shows the left-side arm extending and FIG. 7B shows the right-side arm extending in accordance with one embodiment of the present invention;

FIGS. 10A and 10B are perspective views of a left-side arm and a right-side arm extending to locked position, wherein FIG. 10A shows an arm locking groove forming on the arms and two threaded pressure knobs and FIG. 10B shows the threaded pressure knob engaging the arm locking groove to restrict lateral displacement by the arms in accordance with one embodiment of the present invention;

FIGS. 11A, 11B, and 11C are views of a left concave clamp and a right concave clamp, wherein FIG. 11A shows a cross-sectional view of a right concave clamp, FIG. 11B shows an elevational side view of a left concave clamp, and FIG. 11C shows an elevated side view of a right concave clamp in accordance with one embodiment of the present invention;

FIG. 12 is a perspective view of an exemplary cylindrical drum housing a left-side and a right-side arm in accordance with one embodiment of the present invention;

FIG. 13 is an exploded view of the cylindrical drum of FIG. 12;

FIGS. 14A and 14B are perspective views of a cylindrical drum housing forming exemplary guide members and a left-side and right-side arm forming slots, wherein FIG. 14A shows the arms retracted and the guide members and slots interlocked and FIG. 14B shows a dose-up view of the guide member and slots in the right-side arm in accordance with one embodiment of the present invention;

FIGS. 16A, 16B, and 16C are cross-sectional views of an exemplary spring that is housed within the cylindrical drum, wherein FIGS. 16A-B show the spring fully compressed and the left-side and right-side arms fully retracted in the cylindrical drum and FIG. 16C shows the spring in expanded position.

DETAILED DESCRIPTION

Figure 1:
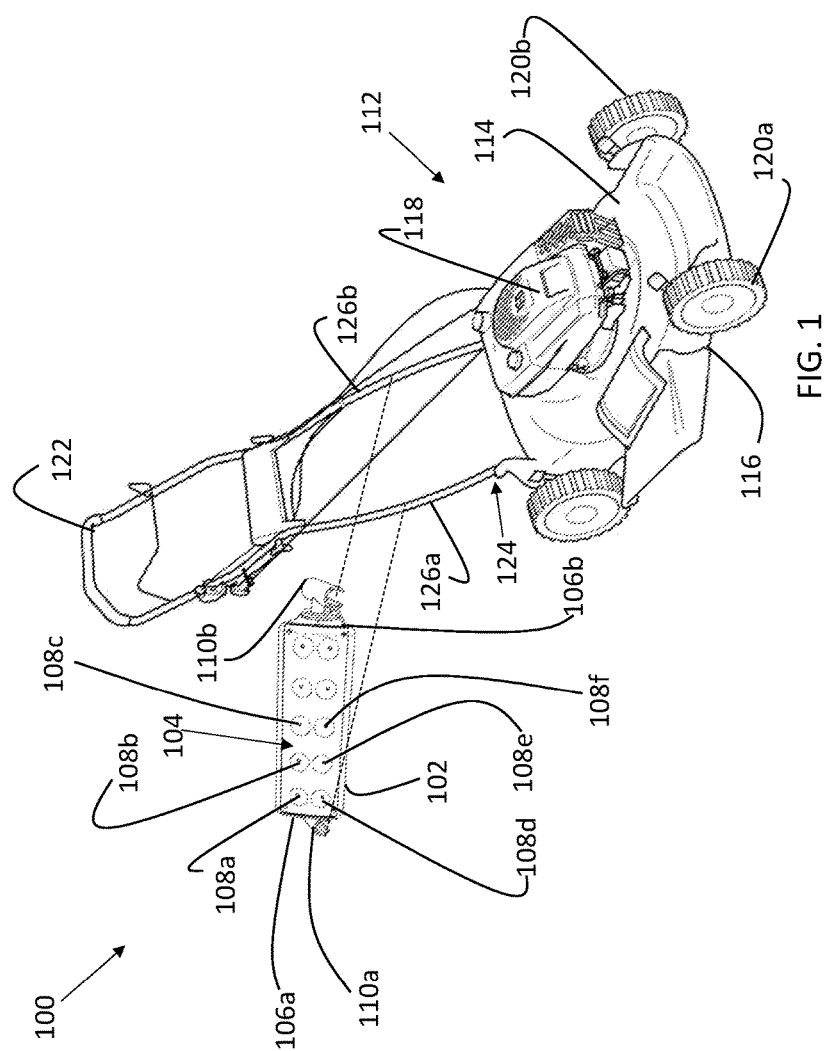
FIG. 1 is a perspective view of an exemplary universal lighting assembly detached from a walk-behind lawn mower, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient lighting assembly that is operable with eclectic types and sizes of walk-behind lawn mowers to provide illumination while mowing a lawn in low visibility conditions. Embodiments of the invention include the lighting assembly having spring biased lateral arms that couple the lighting assembly to the handle of a walk-behind lawn mower. In addition, embodiments of the invention provide a lighting housing that incrementally rotates LEDs towards an area in front of the walk-behind lawn mower to enable directional and intensity adjustable illumination of ambient surroundings in low-light environments.

Referring now to FIG. 1, one embodiment of the present invention is shown in a perspective view. FIG. 1 shows several advantageous features of the present invention, but, as will be described below, the invention can be provided in several shapes, sizes, combinations of features and components, and varying numbers and functions of the components. The first example of a walk-behind lawn mower universal lighting assembly 100, as shown in FIG. 1, includes a walk-behind lawn mower 112 to which the assembly 100 is configured to couple thereto. In one possible embodiment, the walk-behind lawn mower 112 is of the variety used to cut or trim vegetation, including: Grass, brush, foliage, lawns, and the like. The walk-behind lawn mower 112 may include either a push behind mower that requires the user to apply force to manipulate, or a self-propelled lawn mower that requires the user to operate a control system to manipulate the mower.

In one non-limiting embodiment, the walk-behind lawn mower 112 comprises a deck 114 that at least partially covers at least one blade 116. The deck 114 may have a dome-like configuration that substantially covers the blade 116, so as to protect the user from debris that is discharged from the blade 116. The blade 116 is configured to rotate in one direction, engaging the vegetation with a sharp blade. The blade 116 is operably coupled to a motor 118 that powers the nation. Further, the walk-behind lawn mower 112 may utilize wheels 120a-b that are rotatably coupled to the deck 114, so as to enable mobility of the walk-behind lawn mower 112 In this manner, the rotating blades can be mama slated over an area of vegetation for cutting.

In some embodiments shown, the walk-behind lawn mower also comprises a U-shaped handle 122. The hand is "U-shaped" in that it has 2 generally vertical portions that each couple with a generally horizontal portion. The handle 122 provides the gripping surface for pushing, pulling, and, generally manipulating the walk-behind lawn mower 112. The handle 122 may also carry the power switch, throttle, etc., for controlling the self-propelled style walk-behind mower. The handle 122 of the walk-behind lawn mower 112 is generally disposed to extend towards the user, at a rear end of the lawn mower 112.

In another non-limiting embodiment, the handle 122 include a first vertical handle member 126a and a second vertical handle member 126b each respectively having distal ends 124. The vertical handle members 126a-b are coupled to the deck 114. In one embodiment, at least one cross bar may also extend between the vertical handle members 126a-b to provide additional structural integrity to handle 122. In other embodiments, the handle 122 may include any structure that has two opposing vertical or longitudinal members coupled together with a horizontal member.

Figure 2:
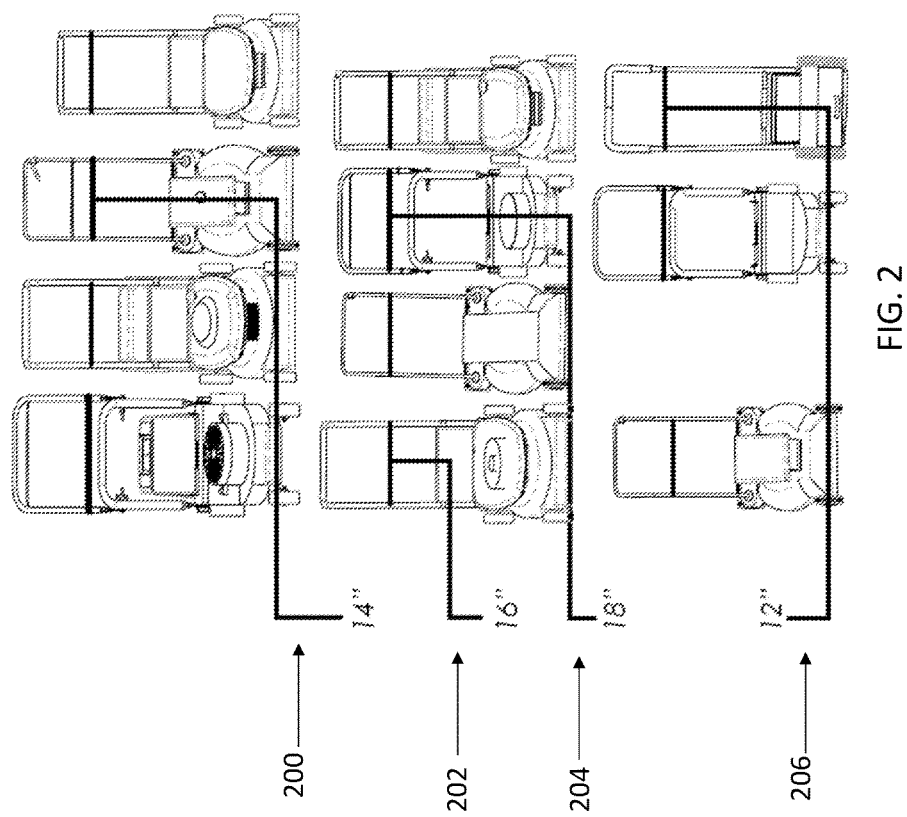
FIG. 2 is a frontal view of exemplary prior-art walk-behind lawn mowers having variously sized handles.

The unique, universal configuration of the assembly 100 enables facilitated coupling and detachment with variously sized and dimensioned lawn mower handles 122. FIG. 2 illustrates four types of walk-behind lawn mowers having differently sized and dimensioned handles that the assembly 100 can detachably couple to, and operate from. A first set of lawn mower handles 200 is about 14" long. A second set of lawn mower handles 202 is about 18" long. A third set of lawnmower handles 204 is about 16" long. A fourth set of lawn mower handles 206 is about 12" long. The assembly is configured to adjust to all of the referenced handles for coupling thereto, while illuminating the area in front of the walk-behind lawn mower 112.

It is also significant to note that the presently disclosed assembly 100 is operable with various types of outdoor power equipment, including, without limitation, a chainsaw, a hedge trimmer, a string trimmer, and any horticultural mechanism used for cutting grass, hedges, trees, and the like.

Turning now to FIG. 3, the assembly 100 may also include a light housing 102 that carries one or more light emitting diodes (LEDs) 108a-n, wherein the letter "n" represents any number greater than one. The light housing 102 comprises a left side 106a, a right side 106b opposing the left side 106a, and a front face 104. In one non-limiting embodiment, the front face 104 of the light housing 102 spans greater than 75% of a width defined by the first and second vertical handle members 126-b in which the concave clamps 110a-b of the respective left-side and right-side arms 700a-b are coupled.

As FIG. 4 illustrates, the light housing 102 may also include a rear face 400 having a concave surface 402. The faces 104, 106a-b, 400 of the light housing 102 form a cavity in the light housing 102 that contains wiring, LEDs 108a-n electrically coupled to our or more power sources through the wiring, arms 700a-b, and other components described below. The light housing 102 may be of a generally rectangular shape. In one non-limiting embodiment, the light housing 102 is about 11.5" long and 3.57" wide. Though other shapes and dimensions may be used.

Figure 5:
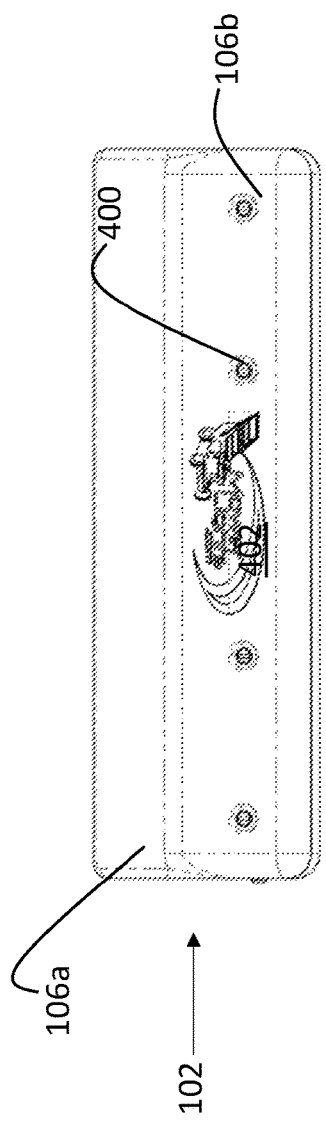
FIG. 5 is a top plan view of the light housing of FIG. 3.
Figure 6:
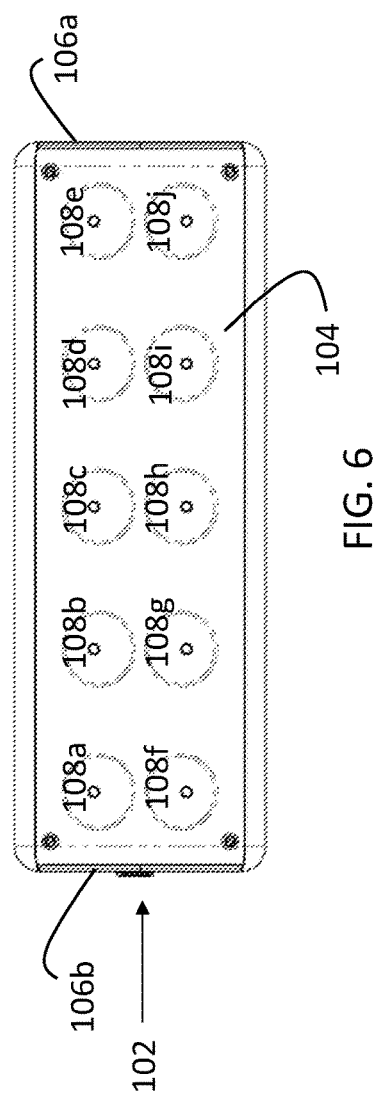
FIG. 6 is an elevational front view of the light housing of FIG. 3.

In one possible embodiment shown in FIG. 5, the light housing 102 carries a plurality of LEDs 108a-n studded into the front face 104 of the light housing 102 and operatively connected to wiring and a power source in the cavity of the light housing 102. In one embodiment, the LEDs 108a-n are of a circular shape, though other shapes may be utilized. The front face 104 of the light housing 102 may also have a reflective coating to reflect the illumination from the LEDs 108a-n (FIG. 6). Further, a protective clear panel 706 may be used to seal the front face 104 of the light housing 102, thereby protecting the LEDs from debris, moisture, environmental conditions, etc. (FIG. 7A).

In some embodiments, other light sources, beyond the LEDs 108a-n may be used. For example, an incandescent light, a fluorescent light, and other lawn lighting means known in the art may be used in place of the LEDs 108a-n. Further, the LED; 108a-n may take any color, and may be adjustable to increase and decrease the intensity, or lumens of the illumination. The LEDs 108a-n are electrically coupled to a power source coupled to the light housing 102. The power source may include, without limitation, a battery, a rechargeable battery, and a solar panel. The power source is operably configured to supply power to the LEDs 108a-n.

Figure 8:
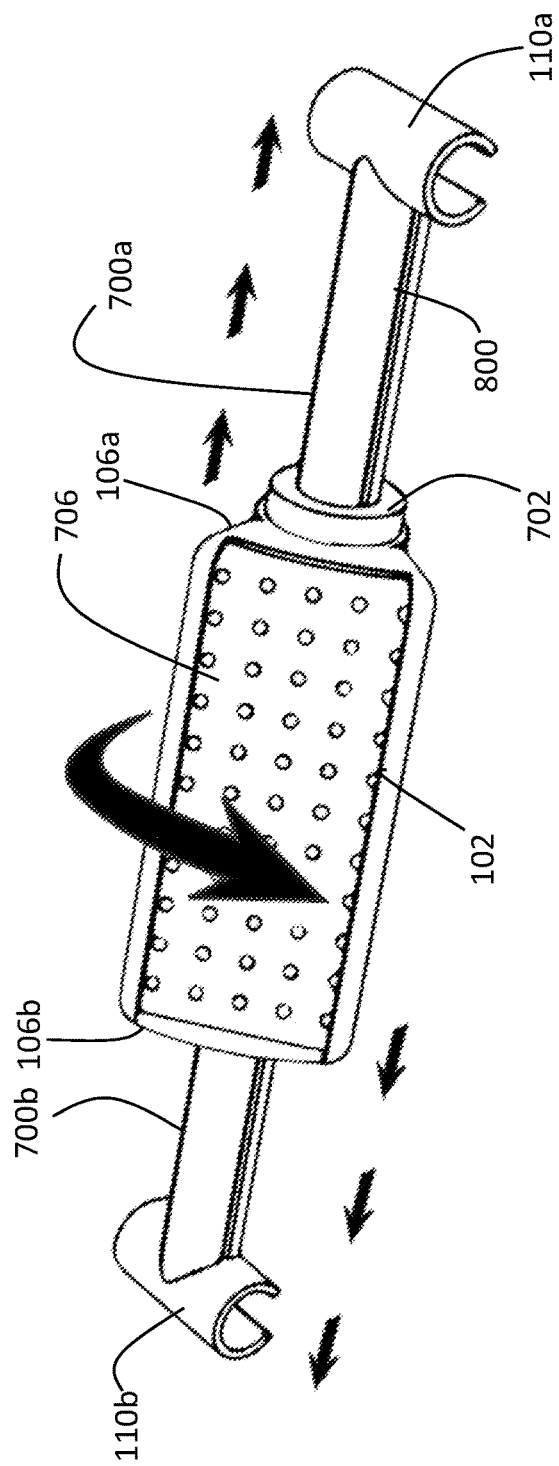
FIG. 8 is a perspective view of a light housing rotating about the left-side arm and right-side, and the arms extending from the sides of the light housing in accordance with one embodiment of the present invention.

Looking now at FIGS. 7A and 7B, the assembly 100 includes a left-side arm 700a and a right-side arm 700b providing an axial structure to support the light housing 102 against the first and second vertical handle members 126a-b of the lawn mower handle 122. The left-side and right-side arms 700a-b project outwardly to engage the vertical handle members 126a-b of the mower. The left-side arm 700a and right-side arm 700b also provide an axle about which the light housing 102 may rotate (FIG. 8).

Figure 9:
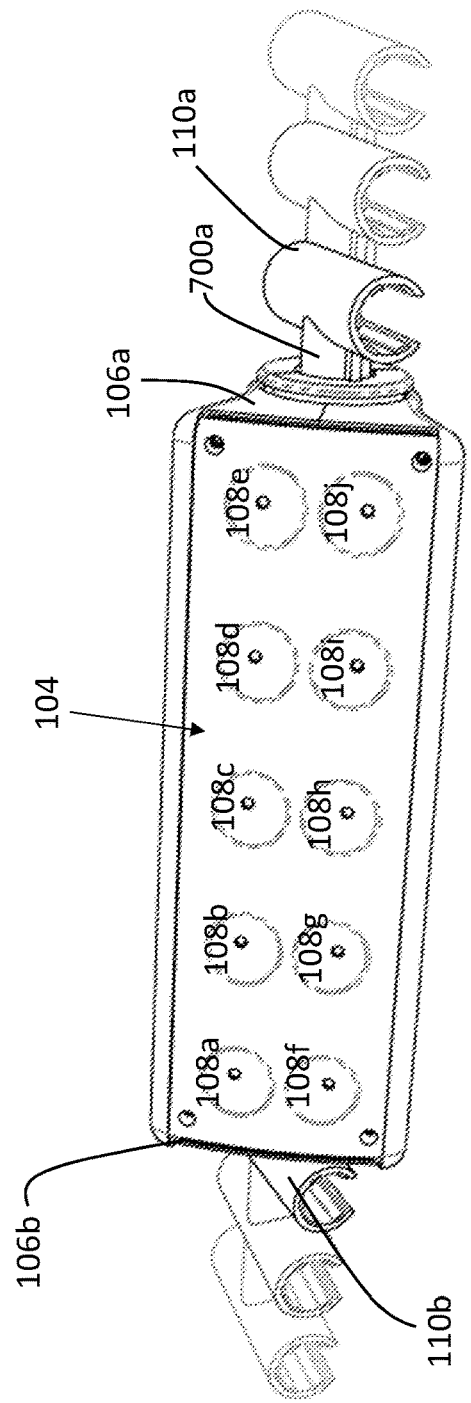
FIG. 9 is perspective view of a left-side arm and a right side arm extending from the sides of the light housing about 14" and 20" in accordance with one embodiment of the present invention.

In one possible embodiment, the left-side arm 700a projects outwardly, and retracts inwardly from the left side of the light housing 102. In this configuration, a space or hole in the left side of the light housing 102 may form to enable passage of the left-side arm 700a. As FIG. 9 illustrates, the left-side arm 700a may project from 14" to 20" from inside the light housing 102. Though other lateral distances for the arm 700a are possible, depending on the dimensions of the lawn mower handle 122.

In one alternative embodiment of an assembly 1000 shown in FIG. 10A, a light housing 1010 serves to house a lockable version of a left-side arm 1006a and a right-side arm 1006b. The left-side and right-side arms 1006a-b extend and retract as described above. However, in this alternative assembly 1000, the extended positions of the left-side arm 1006a and the right-side arm 1006b may be locked into place through a locking mechanism that restricts the arms 1008a-b from extending or retracting after achieving a desired length between the vertical handle members 126a-b of the lawn mower handle 122.

In this embodiment, the left-side and right-side arms 1006a-b form a longitudinally disposed arm locking groove 1002. Further, one or more threaded pressure knobs 1004a-b engages the arm locking groove 1002 to restrict and enable longitudinal displacement of the left-side and right-side arms 1006a-b, and thereby the engagement of a left concave clamp 1008a. and a right concave clamp 1008b to fasten to the vertical handle members 126a-b of the walk-behind lawn mower 112. The threaded pressure knobs 1004a-b are disposed through the light housing 1010, in alignment with the arm locking groove 1002. As shown in FIG. 10B, two threaded pressure knobs 1004a-b are used.

In operation, rotating the threaded pressure knobs 1004a-b in a first direction engages the threaded pressure knob 1004a-b with the arm locking groove 1002. to lock the arms 1006a-b at a desired length. Rotating the threaded pressure knobs 1004a-b in a second direction disengages the threaded pressure knob 1004a-b from the arm locking groove 1002, which releases the arms 1006a-b to extend and retract from the sides of the light housing 1010.

Turning now to FIGS. 11A-C, the left-side arm 700a terminates at a left concave clamp 110a. The left concave clamp 110a is configured to directly couple and retains to the first vertical handle member 126a of the walk-behind lawn mower 112 (FIG. 1), In some embodiments, the left concave clamp 110a includes a base 1100 about 3.3" and is of a "C-shape" 1102 and includes a plurality of grip members 1104. The friction between the concave clamps 110a-b and vertical handle members 126a-b and/or the plurality of grip members 1104, which may be a friction inducing material such as natural rubber, inhibit the clamps 110a-b from sliding vertically along the vertical handle members 126a-b. Said another way, the friction between the concave clamps 110a-b and vertical handle members 126a-b and/or the plurality of grip members 1104 permit the light housing 1010 to stay in the desired position on the vertical handle members 126a-b. The C-shape member 1102 is the portion of the left concave clamp 110a that engages and retains said member 1102 on the first vertical handle member 126a in a secure manner. In one embodiment, the width of the C-shaped member 1102 is fixed (FIG. 11B). In other embodiments, the width of the C-shaped member 1102 may be increased or decreased through threaded or spring-loaded adjustment means.

As FIG. 11C shows, the interior surface of the C-shaped member 1102 may be studded with grip members 1104 to increase the grip between the left concave clamp 110a and the first vertical handle member 126a. The grip members 1104 may consist of oscillating ridges, or may have other shapes or configurations. Said another way, any gripping mechanism or composition known in the art may be used to retain the C-shaped member 1102 to a respective vertical handle member 126a-b. In any case, the left concave clamp 110a is universally adapted to engage and fasten to variously sized and shaped vertical handle members, including a cylindrical shape, a rectangular shape, and a triangular shape.

Looking again at FIG. 7B, there lies opposite the left-side arm 700a, a right-side arm 700b. The right-side arm 700b projects outwardly, and may retract inwardly from the right side of the light housing 102. The right-side arm 700b may be integrated with, and collinear with the left-side arm 700a. However, in other embodiments, the left-side and right-side arms 700a-b are independent components disposed in a collinear arrangement (FIG. 13).

Similar to the left-side arm 700a, the right-side arm 700b terminates at a right concave clamp 110b (FIG. 11C). The right concave clamp 110b directly couples and retains to the second vertical handle member 126b of the handle 122 for the walk-behind lawn mower 112. In this manner, the left-side and right-side arms 700a-b extend between the first and second vertical handle members 126a-b of the walk-behind lawn mower 112, Similar to the left concave clamp 110a the right concave clamp 110b is also adapted to grip variously sized and shaped handles for a walk-behind lawn mower 112. The front face 104 of the light housing 102 couples to the left-side arm 700a and the right-side arm 700b.

With reference to FIG. 9, the light housing 102 is operably configured to rotate with respect to the retained left-side and right-side arms 700a-b. Further, the left-side and right-side arms 700a-b each respectively define slots 800 disposed in a radial spaced-apart arrangement. The slots 800 are configured to receive a guide member 1400 (shown best in FIG. 14) a cylindrical drum 702 (shown best in FIG. 12) to restrict rotation of the drum 702 and/or housing 102.

Referring now to FIGS. 7 and 12-13, the cylindrical drum 702 of the assembly 100 may include a cylindrical surface 704 of an elongated shape. The cylindrical drum 702 is adapted to house the left-side and, right-side arms 700a-b, As discussed above, the light housing 102 has a rear face 400 opposing the front face 104, The rear face 400 of the light housing 102 forms a concave surface 402 shaped and sized to receive the cylindrical surface 704 of the cylindrical drum 702. In one non-limiting embodiment, the cylindrical drum 702 may include a clam shell design that is fastened together at free ends with at least one fastening mechanism 1302a-c to form the cylindrical shape.

In one non-limiting embodiment, the cylindrical drum 702 is configured to couple to the left-side and right-side arms 700a-b. The cylindrical drum 702 is further configured to extend through the light housing 102 with the left-side and right-side arms 700a-b, such that the cylindrical drum 702 receives and houses a substantial length of the left-side and right-side arms 700a-b. This may form a snug friction fit relationship that allows the arms 700a-b and the cylindrical drum 702 to remain stationary while the light housing 102 rotates thereon.

In essence, the left and right clamps 110a-b and the cylindrical drum 702 are stationary and fixed, e.g., not designed to rotate when clamped to the vertical handle members 126a-b of the lawn mower handle 122. Thus, only the light housing 102, when rotatably coupled to the drum 702, may rotate in this configuration. Further, the cylindrical drum 702 is configured to house a spring 1300 in a longitudinal disposition between the left-side and right-side arms 700a-b, which provides the force to retain he light housing 102 between the vertical handle members 126a-b.

However, in other embodiments, the cylindrical drum 702 couples to the light housing 102, thereby rotating with the light housing 102. For this configuration, bearings may be disposed between the left-side and right-side arms 700a-b and the cylindrical drum 702 to enable the cylindrical drum 702 to rotate with the light housing 102 while the arms 700a-b and clamps 110a-b remain stationary. Other mechanisms known in the art may also be used to enable independent rotation of the cylindrical drum 702 and the light housing 102 relative to the fixed left-side and right-side arms 700a-b and the vertical handle members 126a-b.

Looking at the exploded view of FIG. 13, the cylindrical drum 702 includes a left end 708a and a right end 708b that opposes the left end 708a. The left and right ends 708a-b of the cylindrical drum 702 have a guide member 1400. The guide member 1400 is disposed within the slots 800 formed in the left-side and right-side arms 700a-b. In this position, the guide member 1400 fits into the slots 800 in the arms 700a-b to restrict the cylindrical drum 702 from rotational movement by the portion of the cylindrical drum 702 defined by the guide member 1400.

Figure 14A:
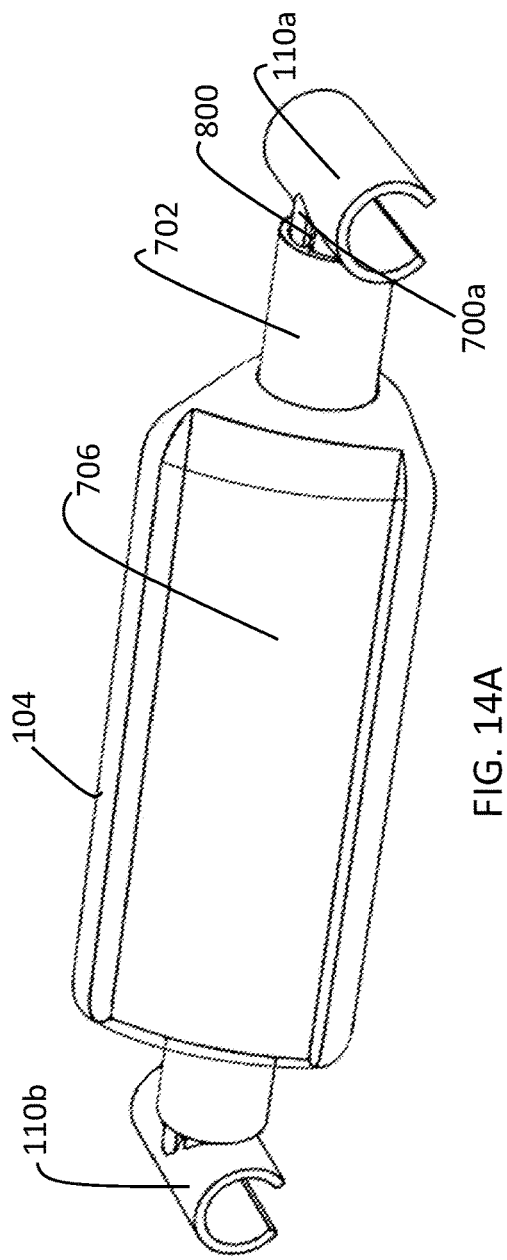
Figure 14B:
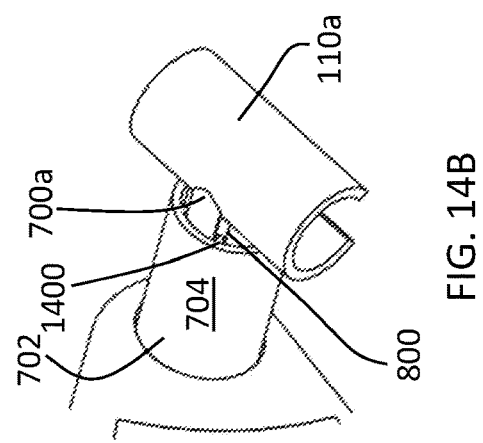
Figure 15:
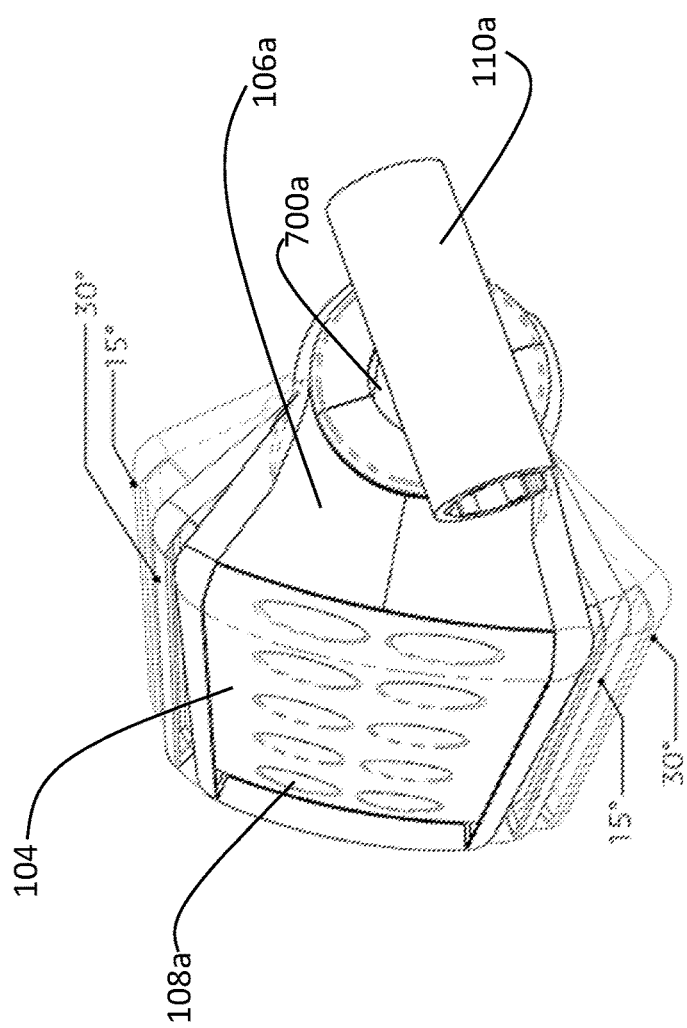
FIG. 15 is a perspective side view of the light housing rotating from a center position to a locked predetermined angle of about 15° and 30° above and below the center position in accordance with one embodiment of the present invention.

As shown in FIGS. 14A-B, the slots 800 work with the guide member 1400 to restrict rotation of the light housing 102 beyond a predetermined angle. As the housing 102 may be frictionally and rotationally coupled and retained on the drum 702, the user may incrementally rotate the light housing 102 at an angle above and below a center axis, or horizontal position (0°). For example, in one embodiment shown in FIG. 15, the light housing 102 rotates from a center position to a locked or retained in pied tern Med angles of approximately 15° and 30° above and below the center position. Though m other embodiments, the light housing 102 may be configured to rotate to, and lock at greater or lesser angles desired by the user.

In an alternative embodiment, the guide member 1400 is disposed on the left-side and right-side arms 700a-b, and the cylindrical drum 702 firms the slots 800 that receive the guide member 1400. In any case, rotational restriction of the light housing 102 beyond a predetermined angle is performed.

Figure 16A:
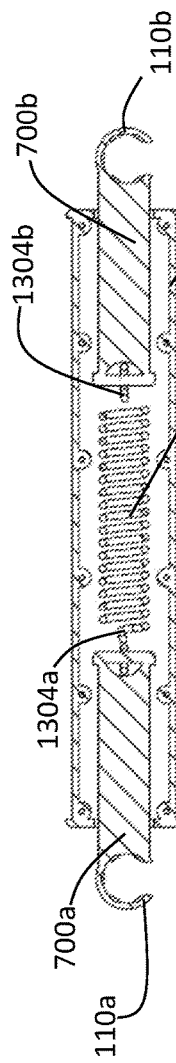
Figure 16B:
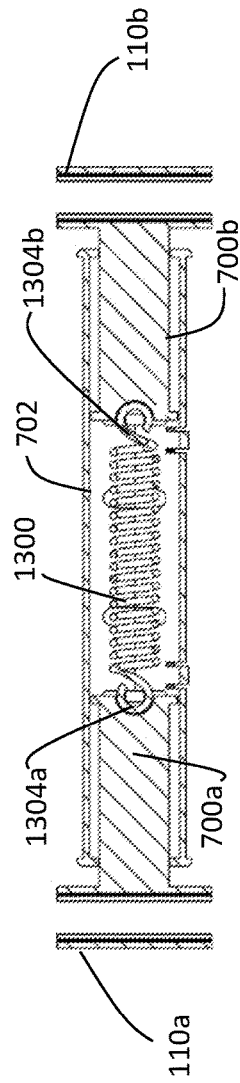
Figure 16C:
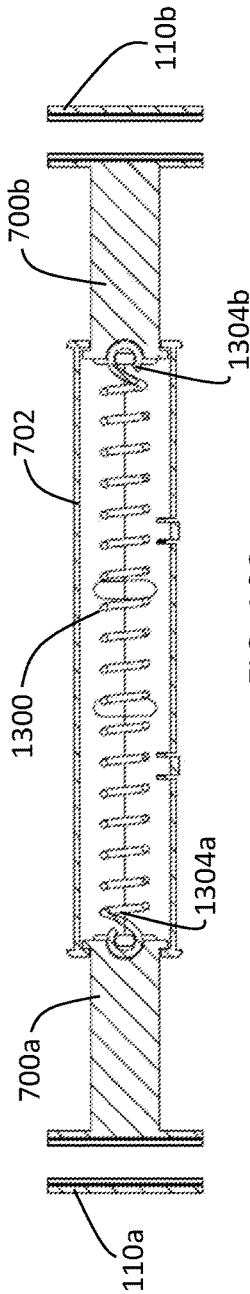

Looking now at the sectioned views of FIGS. 16A-C, the assembly 100 includes a spring 1300 that is housed within the cylindrical drum 702. The spring 1300 has opposing ends 1304a, 1304b respectively coupled to the left-side and right-side arms 700a-b. The spring 1300 biases the left-side and right-side arms 700a-b in a longitudinal direction of the cylindrical drum 702 (FIG. 16B). It is this biasing force that facilitates in retaining the light housing 102 between the vertical handle members 126a-b of the lawn mower handle 122. For this purpose, the spring 1300 may compressively biases the left-side and right-side arms 700a-b inwardly. In other embodiments, the spring 1300 may place the left-side and right-side arms 700a-b in tension, pushing the left-side and right-side arms against the first and second vertical handle members 126a-b.

In one embodiment, the spring 1300 is configured to have a spring constant that compressively biases the left-side and right-side arms 700a-b. Said another way, the spring constant may be a value between a range of 1-5 lb./foot, though a value outside of said range may be employed. The spring 1300 may include a standard metal cod known in the art, as illustrated in FIG. 16C.

In operation, a walk-behind lawn mower 112 is provided. The lawn mower 112 includes a deck 114 that at least partially covers at least one blade 116 operably coupled to a motor 118. The walk-behind lawn mower 112 further includes wheels 120 rotatably coupled to the deck 114, and a U-shaped handle 122 with respective distal ends 124 of first and second vertical handle members 126a-b coupled to the deck 114. The universal lighting assembly 100 is positioned between the first and second vertical handle members 126a-b, with the front face 104 of the light housing 102 oriented toward a forward end of the walk-behind lawn mower 112.

The left-side arm 700a is extended to engage the first vertical handle member 126a of the walk-behind lawn mower until the left concave clamp 110a of the left-side arm directly couples and retains to the first vertical handle member 126a, The right-side arm 700b is extended to engage the second vertical handle member 126b of the walk-behind lawn mower 112 until the right concave clamp 110b of the right-side arm 700b directly couples, and retains to the right vertical handle member 126b. The spring 1300 may compressively bias the left-side and right-side arms 700a-b, requiring the user to extend the left-side and right-side arms 700a-b to attach the arms 700a-b to the vertical handle members.

The ham housing 102 is oriented at a center, or horizontal position (0°) and/or may be rotated to a desired orientation by the user to illuminate the desired location, and locked. (e.g., using one or more fasteners) and/or retained in place.

A power switch 404 may then be actuated to illuminate the at least one LED 108a-n located on the front face 104 of the light housing 102.

The motor 118 of the walk-behind lawn mower 112 is powered on to operate the blade 116. The walk-behind lawn mower 112 is pushed, pulled, and manipulated to cut the vegetation, with the front area being illuminated for enhanced visibility. The front area of the walk-behind lawn mower 112 is illuminated by the LED 108a-n during the cutting of the vegetation, Looking back to FIG. 1 a universal lighting assembly 100 has been disclosed that detachably couples to a handle 122 of a walk-behind lawn mower 112 to illuminate areas in front of lawn mower 112. The assembly 100 is universal, and thus operable with wide varieties of walk-behind lawn mowers. The assembly 100 comprises a light housing 102 having a left side 106a, a right side 106b, and a front face 104 with at least one LED 108a-n. A left-side and a right-side arm 700a-b project outwardly, and retract inwardly to the light housing 102.

A left and right concave clamp 110a-b from each arm 700a-b couples to the lawn mower handle 122. A cylindrical drum 702 couples to the left-side and right-side arms 700a-b; or, in some embodiments, couples to the light housing 102. The clamps 110a-b and the cylindrical drum 702 are stationary and not designed to rotate when damped to the handle 122, thereby permitting rotation of the light housing 102.

What is claimed is:

1. In combination with a walk-behind lawn mower having a deck at least partially covering at least one blade operably coupled to a motor, wheels rotatably coupled to the deck, and a U-shaped handle with respective distal ends of first and second vertical handle members coupled to the deck, wherein an improvement comprises:
   a light housing having a left side, a right side opposing the left side, and a front face with at least one LED disposed thereon and electrically coupled to a power source coupled to the light housing, the power source operably configured to supply power to the LED;
   a left-side arm projecting outwardly from the left side of the light housing and having a left C-shaped clamp with an enclosed concave surface directly and selectively removably coupled to and surrounding, to securely retain to, the first vertical handle member; and
   a right-side arm projecting outwardly from the right side of the light housing and having a right C-shaped clamp with an enclosed concave surface directly and selectively removably coupled to and surrounding, to securely retain to, the second vertical handle member, the front face of the light housing coupled to the left-side arm and the right-side arm and operably configured to rotate with respect to the retained left-side and right-side arms.

2. The improvement according to claim 1, further comprising:
   a cylindrical drum coupled to the left-side and right-side arms, the light housing having a rear face opposing the front face, the rear face of the light housing forming a concave surface shaped and sized to receive a cylindrical surface of the drum.

3. The improvement according to claim 2, further comprising:
   a spring housed within the cylindrical drum and with opposing ends respectively coupled to the left-side and right-side arms, the spring biasing the left-side and right-side arms in a longitudinal direction of the cylindrical drum, the spring compressively biasing the left-side and right-side arms.

4. The assembly according to claim 3, wherein:
   the spring compressively biases the left-side and right-side arms.

5. The improvement according to claim 1, further comprising:
   a cylindrical drum coupled to the light housing and housing a portion of the left-side and right-side arms, the left-side and right-side arms directly coupled to opposing ends of a spring, the spring biasing the left-side and right-side arms in a longitudinal direction of the cylindrical drum.

6. The improvement according to claim 1, wherein:
   the left-side and right-side arms define slots, respectively, disposed in a radial spaced-apart arrangement from one another.

7. The improvement according to claim 6, further comprising:
   a cylindrical drum having a left end and a right end opposing the left end, the left and right ends of the cylindrical drum comprising a guide member, the guide member disposed within the slots forming in the left-side and right-side arms, and substantially restricting the cylindrical drum from rotational movement by the portion of the cylindrical drum defined by the guide member.

8. The improvement according to claim 1, further comprising:
   a plurality of LEDs disposed on the front face of the light housing, the front face of the light housing spanning greater than 75% of a width defined by the first and second vertical handle members in which the concave clamps of the respective left-side and right-side arms are coupled.

9. A walk-behind lawn mower universal lighting assembly comprises:
   a light housing having a left side, a right side opposing the left side, and a front face with at least one LED disposed thereon and electrically coupled to a power source coupled to the light housing, the power source operably configured to supply power to the LED;
   a left-side arm projecting outwardly from the left side of the light housing and having a left concave clamp;
   a right-side arm projecting outwardly from the right side of the light housing and having a right concave clamp, the front face of the light housing coupled to the left-side arm and the right-side arm and operably configured to rotate with respect to the retained left-side and right-side arms, the left-side and right-side arms each respectively defining slots disposed in a radial spaced-apart arrangement with one another;
   a cylindrical drum coupled to the left-side and right-side arms, the light housing having a rear face opposing the front face, the rear face of the light housing forming a concave surface shaped and sized to receive a cylindrical surface of the cylindrical drum, the cylindrical drum including a left end and a right end opposing the left end, the left and right ends of the cylindrical drum comprising a guide member each disposed within the slots of the left-side and right-side arms, respectively, and substantially restricting the cylindrical drum from rotational movement; and
   a spring housed within the cylindrical drum and with opposing ends respectively coupled to the left-side and right-side arms, the spring biasing the left-side and right-side arms in a longitudinal direction of the cylindrical drum, the spring compressively biasing the left-side and right-side arms.

10. The assembly according to claim 9, wherein:
the cylindrical drum couples to the light housing and houses a portion of the left-side and right-side arms, the left-side and right-side arms directly coupled to opposing ends of the spring.

11. The assembly according to claim 9, further comprising:
a plurality of LEDs disposed on the front face of the light housing, the front face of the light housing spanning greater than 75% of a width defined by the first and second vertical handle members in which the concave clamps of the respective left-side and right-side arms are coupled.

12. The assembly according to claim 9, further comprising:
a walk-behind lawn mower, the walk-behind lawn mower having a deck at least partially covering at least one blade operably coupled to a motor, wheels rotatably coupled to the deck, and a U-shaped handle with respective distal ends of first and second vertical handle members coupled to the deck.

13. The assembly according to claim 12, wherein:
the left concave clamp of the left-side arm directly couples and retains to the first vertical handle member of the walk-behind lawn mower.

14. The assembly according to claim 13, wherein:
the right concave clamp of the right-side arm directly couples and retains to the second vertical handle member of the walk-behind lawn mower.

15. The assembly according to claim 9, wherein:
the left-side and right side arms form longitudinally disposed arm locking grooves.

16. The assembly according to claim 15, further comprising:
a threaded pressure knob disposed in alignment with the arm locking grooves.

17. The assembly according to claim 16, wherein:
rotating the threaded pressure knobs in a first direction engages the threaded pressure knob with the arm locking grooves, whereby rotating the threaded pressure knobs in a second direction disengages the threaded pressure knob from the arm locking grooves.

18. A walk-behind lawn mower universal lighting assembly, consisting of:
a light housing having a left side, a right side opposing the left side, and a front face with a plurality of LEDs disposed on the front face of the light housing, the front face of the light housing spanning greater than 75% of a width defined by the first and second vertical handle members in which the concave clamps of the respective left-side and right-side arms are coupled, the LEDs being electrically coupled to a power source coupled to the light housing, the power source operably configured to supply power to the LEDs;
a clear panel covering the front face of the light housing;
a left-side arm projecting outwardly from the left side of the light housing and having a left concave clamp;
a right-side arm projecting outwardly from the right side of the light housing and having a right concave clamp, the front face of the light housing coupled to the left-side arm and the right-side arm and operably configured to rotate with respect to the retained left-side and right-side arms, the left-side and right-side arms being defined by slots disposed in a radial spaced-apart arrangement;
a cylindrical drum coupled to the left-side and right-side arms, the light housing having a rear face opposing the front face, the rear face of the light housing forming a concave surface shaped and sized to receive a cylindrical surface of the cylindrical drum, a left end and a right end opposing the left end, the left and right ends of the cylindrical drum comprising a guide member, the guide member disposed within the slots forming in the left-side and right-side arms, and substantially restricting the cylindrical drum from rotational movement by the portion of the cylindrical drum defined by the guide member;
a spring housed within the cylindrical drum and with opposing ends respectively coupled to the left-side and right-side arms, the spring biasing the left-side and right-side arms in a longitudinal direction of the cylindrical drum, the spring compressively biasing the left-side and right-side arms; and
a walk-behind lawn mower, the walk-behind lawn mower having a deck at least partially covering at least one blade operably coupled to a motor, wheels rotatably coupled to the deck, and a U-shaped handle with respective distal ends of first and second vertical handle members coupled to the deck, whereby the left concave clamp of the left-side arm directly couples and retains to the first vertical handle member of the walk-behind lawn mower; and
whereby the right concave clamp of the right-side arm directly couples and retains to the second vertical handle member of the walk-behind lawn mower.

19. In combination with a walk-behind lawn mower having a deck at least partially covering at least one blade operably coupled to a motor, wheels rotatably coupled to the deck, and a U-shaped handle with respective distal ends of first and second vertical handle members coupled to the deck, wherein an improvement comprises:
a light housing having a left side, a right side opposing the left side, and a front face with at least one LED disposed thereon and electrically coupled to a power source coupled to the light housing, the power source operably configured to supply power to the LED;
a left-side arm projecting outwardly from the left side of the light housing and having a left concave surface directly coupled and retained to the first vertical handle member;
a right-side arm projecting outwardly from the right side of the light housing and having a right concave clamp directly coupled and retain to the second vertical handle member, the front face of the light housing coupled to the left-side arm and the right-side arm and operably configured to rotate with respect to the retained left-side and right-side arms, the left-side and right-side arms define slots, respectively, disposed in a radial spaced-apart arrangement from one another; and
a cylindrical drum having a left end and a right end opposing the left end, the left and right ends of the cylindrical drum including a guide member, the guide member disposed within the slots defined by the left-side and right-side arms, respectively, and substantially restricting the cylindrical drum from rotational movement.

20. A walk-behind lawn mower universal lighting assembly comprises:
- a light housing having a left side, a right side opposing the left side, and a front face with at least one LED disposed thereon and electrically coupled to a power source coupled to the light housing, the power source operably configured to supply power to the LED;
- a left-side arm projecting outwardly from the left side of the light housing and having a left concave clamp;
- a right-side arm projecting outwardly from the right side of the light housing and having a right concave clamp, the front face of the light housing coupled to the left-side arm and the right-side arm and operably configured to rotate with respect to the retained left-side and right-side arms;
- a cylindrical drum coupled to the left-side and right-side arms, respectively, in a locking groove-and-guide configuration substantially restricting the cylindrical drum from rotational movement, the light housing having a rear face opposing the front face, the rear face of the light housing forming a concave surface shaped and sized to receive a cylindrical surface of the cylindrical drum; and
- a spring housed within the cylindrical drum and with opposing ends respectively coupled to the left-side and right-side arms, the spring biasing the left-side and right-side arms in a longitudinal direction of the cylindrical drum, the spring compressively biasing the left-side and right-side arms.

* * * * *